United States Patent
Hsiao et al.

(10) Patent No.: US 8,289,482 B2
(45) Date of Patent: Oct. 16, 2012

(54) TRANSFLECTIVE LIQUID CRYSTAL DISPLAY DEVICE WITH PLURALITY OF ELECTRODES FORMED ON COLOR FILTER

(75) Inventors: Chia-Chiang Hsiao, Hsinchu (TW); Chih-Wen Chen, Hsinchu (TW); Li-Chih Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 384 days.

(21) Appl. No.: 12/639,786

(22) Filed: Dec. 16, 2009

(65) Prior Publication Data

US 2011/0141410 A1    Jun. 16, 2011

(51) Int. Cl.
*G02F 1/1335*    (2006.01)
*G09G 3/36*    (2006.01)

(52) U.S. Cl. ............ 349/114; 349/96; 349/98; 349/106; 349/113; 345/88

(58) Field of Classification Search .................. 349/106, 349/141, 99, 98, 96, 103–104; 345/88
See application file for complete search history.

(56) References Cited

U.S. PATENT DOCUMENTS

| | | | | |
|---|---|---|---|---|
| 6,816,222 B2 * | 11/2004 | Ono et al. | ...... | 349/143 |
| 6,819,375 B2 | 11/2004 | Wachi | | |
| 7,420,635 B2 | 9/2008 | Ozawa | | |
| 7,639,327 B2 | 12/2009 | Ozawa | | |
| 7,692,745 B2 * | 4/2010 | Igeta et al. | ...... | 349/114 |
| 7,843,541 B2 | 11/2010 | Haruyama | | |
| 2004/0056999 A1 | 3/2004 | Ko et al. | | |
| 2005/0024563 A1 * | 2/2005 | Jang et al. | ...... | 349/117 |
| 2005/0083462 A1 | 4/2005 | Lin | | |
| 2006/0256264 A1 * | 11/2006 | Yang et al. | ...... | 349/114 |
| 2006/0256268 A1 * | 11/2006 | Jeong et al. | ...... | 349/141 |
| 2008/0002116 A1 | 1/2008 | Son et al. | | |
| 2008/0100764 A1 * | 5/2008 | Haruyama | ...... | 349/43 |
| 2009/0009447 A1 | 1/2009 | Naka et al. | | |
| 2009/0079919 A1 | 3/2009 | Niioka et al. | | |
| 2009/0079921 A1 | 3/2009 | Mori et al. | | |
| 2009/0284693 A1 | 11/2009 | Adachi et al. | | |

FOREIGN PATENT DOCUMENTS

| | | |
|---|---|---|
| CN | 101359118 A | 2/2009 |
| EP | 1793266 A1 | 6/2007 |
| JP | 2005338881 A | 12/2005 |
| JP | 2006215287 A | 8/2006 |
| JP | 2008112021 A | 5/2008 |

* cited by examiner

*Primary Examiner* — Hoan C Nguyen
(74) *Attorney, Agent, or Firm* — Morris Manning & Martin LLP; Tim Tingkang Xia, Esq.

(57) ABSTRACT

The present invention in one aspect relates to a transflective liquid crystal display (LCD) comprising a plurality of pixels. Each pixel includes a first structure defining a reflective area and a transmissive area adjacent to the reflective area, a second structure positioned apart from the first structure to define a single cell gap therebetween, a liquid crystal layer positioned in the cell gap, and a plurality of electrodes formed on one of the first structure and the second structure such that at least two electrodes are positioned in the transmissive area and define a first distance, $d1$, therebetween, and at least two electrodes are positioned in the reflective area and define a second distance, $d2$, therebetween, where $d2>d1$, preferably, $d2=\sqrt{2}d1$.

16 Claims, 5 Drawing Sheets

TRANSFLECTIVE LIQUID CRYSTAL DISPLAY DEVICE WITH PLURALITY OF ELECTRODES FORMED ON COLOR FILTER

FIELD OF THE INVENTION

The present invention relates generally to a liquid crystal display (LCD), and more particularly, to a transflective LCD.

BACKGROUND OF THE INVENTION

Liquid crystal display (LCD) is commonly used as a display device because of its capability of displaying images with good quality while using little power. LCD devices can be broadly classified into transmissive LCD devices and reflective LCD devices. In general, a transmissive LCD device has a backlight light source, and displays an image by controlling an amount of transmitted light from the backlight light source. A reflective LCD device has a reflector for reflecting light from outside, and displays an image by utilizing the light reflected by the reflector as a display light source. The reflective LCD device requires no backlight light source, so that it has an advantage over the transmissive LCD device in terms of reducing the power consumption, the thickness, and the weight of the device. However, the reflective LCD device has such a shortcoming that the contrast and visibility become deteriorated under a dark condition, since it uses light in the surroundings as the display light source.

In order to overcome the foregoing drawbacks, transflective LCD devices that have advantages of both the transmissive LCD device and the reflective LCD device have been put into practical use. A transflective LCD device has a transmissive area and a reflective area within a unit pixel. The transmissive area transmits light from a backlight light source, and uses the backlight light source as a display light source. The reflective area has a reflector, and uses external light that is reflected by the reflector as a display light source. With the transflective LCD device, it is possible to reduce the power consumption by putting out the backlight light source and displaying an image with the reflective areas under a bright condition. Further, it is also possible to display an image even under a dark condition by putting on the backlight light source and displaying an image with the transmissive areas when the surrounding condition turns dark.

Conventionally, a transflective LCD device is designed to have a multi-cell gap so as to ensure the lengths of light transmitting through the transmissive area and of light reflected back by the reflective area to be same. Manufacturing such a transflective LCD usually requires more masks and more processing steps. Additionally, a traditional transflective IPS LCD is also designed to include one or more pattern retarders. This will increase the manufacture cost on one hand. On the other hand, it enlarges the size of the LCD.

Therefore, a heretofore unaddressed need exists in the art to address the aforementioned deficiencies and inadequacies.

SUMMARY OF THE INVENTION

In one aspect, the present invention relates to a transflective liquid crystal display (LCD) comprising a plurality of pixels. Each pixel comprises a first structure comprising a first substrate having a first surface and an opposite, second surface, a first quarter-wave film formed on the first surface of the first substrate, a first polarization film formed on the first quarter-wave film, an organic layer having a bump area and a flat area extending from the bump area, formed on the second surface of the first substrate, a metal layer formed on the bump area of the organic layer so as to define a reflective area therewith and a transmissive area adjacent to the reflective area, an insulating layer formed on the metal layer and the flat area of the organic layer, and a plurality of electrodes formed on the insulating layer such that at least two electrodes are positioned in the transmissive area and define a first distance, d1, therebetween, and at least two electrodes are positioned in the reflective area and define a second distance, d2, therebetween, wherein d2>d1. In one embodiment, d2=√2 d1. The metal layer is non-transparent to light. The bump area is protruded relative to the flat area of the organic layer.

Each pixel also comprises a second structure comprising a second substrate having a first surface and an opposite, second surface a second quarter-wave film formed on the second surface of the second substrate, a second polarization film formed on the second quarter-wave film, and a color filter formed on the first surface of the second substrate, where the first structure and the second structure are positioned relative to each other to define a cell gap therebetween.

In one embodiment, the first polarization film is corresponding to one of a left-circular polarizer and a right-circular polarizer, and wherein the second polarization film is the other of the left-circular polarizer and the right-circular polarizer. In another embodiment, each of the first polarization film and the second polarization film includes a linear polarizer having a polarization axis, and wherein the first polarization film and the second polarization film are arranged such that the polarization axis of the first polarization film is perpendicular to that of the second polarization film.

Each pixel further comprises a liquid crystal layer positioned in the cell gap between the first structure and the second structure. In one embodiment, the liquid crystal layer comprises liquid crystals in the blue phase.

The transmissive area is adapted for allowing light transmission sequentially through the first structure, the liquid crystal layer and the second structure, thereby defining a transmissively optical path of light, and the reflective area is adapted for allowing light entering from the second structure through the liquid crystal layer to reflect at the metal layer back through the liquid crystal layer to the second structure, thereby defining a reflectively optical path of light. In one embodiment, the reflectively optical path has a length that is substantially same as that of the transmissively optical path.

In another aspect, the present invention relates to a transflective LCD comprising a plurality of pixels. Each pixel has (a) a first structure comprising a first substrate having a first surface and an opposite, second surface, a first quarter-wave film formed on the first surface of the first substrate, a first polarization film formed on the first quarter-wave film, an organic layer having a bump area and a flat area extending from the bump area, formed on the second surface of the first substrate, and a metal layer formed on the bump area of the organic layer so as to define a reflective area therewith and a transmissive area adjacent to the reflective area; (b) a second structure comprising a second substrate having a first surface and an opposite, second surface, a second quarter-wave film formed on the second surface of the second substrate, a second polarization film formed on the second quarter-wave film, a color filter formed on the first surface of the second substrate, and a plurality of electrodes formed on the color filter such that at least two electrodes are positioned in the transmissive area and define a first distance, d1, therebetween, and at least two electrodes are positioned in the reflective area and define a second distance, d2, therebetween, wherein d2>d1, where the first structure and the second structure are positioned relative to each other to define a cell gap therebetween; and (c) a liquid crystal layer positioned in the cell gap between the first structure and the second structure. In one embodiment, $d2=\sqrt{2}\,d1$. The liquid crystal layer comprises liquid crystals in the blue phase. The bump area is protruded relative to the flat area of the organic layer. The metal layer is non-transparent to light.

In one embodiment, the first polarization film is corresponding to one of a left-circular polarizer and a right-circular polarizer, and wherein the second polarization film is the other of the left-circular polarizer and the right-circular polarizer. In another embodiment, each of the first polarization film and the second polarization film includes a linear polarizer having a polarization axis, and wherein the first polarization film and the second polarization film are arranged such that the polarization axis of the first polarization film is perpendicular to that of the second polarization film.

The transmissive area is adapted for allowing light transmission sequentially through the first structure, the liquid crystal layer and the second structure, thereby defining a transmissively optical path of light, and wherein the reflective area is adapted for allowing light entering from the second structure through the liquid crystal layer to reflect at the metal layer back through the liquid crystal layer to the second structure, thereby defining a reflectively optical path of light. In one embodiment, the reflectively optical path has a length that is substantially same as that of the transmissively optical path.

In yet another aspect, the present invention relates to a transflective LCD comprising a plurality of pixels. Each pixel has a first structure defining a reflective area and a transmissive area adjacent to the reflective area, a second structure positioned apart from the first structure to define a cell gap therebetween, a liquid crystal layer positioned in the cell gap between the first structure and the second structure, and a plurality of electrodes formed on one of the first structure and the second structure such that at least two electrodes are positioned in the transmissive area and define a first distance, $d1$, therebetween, and at least two electrodes are positioned in the reflective area and define a second distance, $d2$, therebetween, wherein $d2>d1$, preferably, $d2=\sqrt{2}\,d1$. In one embodiment, the liquid crystal layer comprises liquid crystals in the blue phase.

The transmissive area is adapted for allowing light transmission sequentially through the first structure, the liquid crystal layer and the second structure, thereby defining a transmissively optical path of light, wherein the reflective area is adapted for allowing light entering from the second structure through the liquid crystal layer to reflect at the metal layer back through the liquid crystal layer to the second structure, thereby defining a reflectively optical path of light, and wherein the reflectively optical path has a length that is substantially same as that of the transmissively optical path.

In one embodiment, the first structure comprises a first substrate having a first surface and an opposite, second surface, a first quarter-wave film formed on the first surface of the first substrate, a first polarization film formed on the first quarter-wave film, an organic layer having a bump area and a flat area extending from the bump area, formed on the second surface of the first substrate, and a metal layer formed on the bump area of the organic layer to define the reflective area therewith and the transmissive area adjacent to the reflective area. The bump area is protruded relative to the flat area of the organic layer. The metal layer is non-transparent to light.

The second structure comprises a second substrate having a first surface and an opposite, second surface, a second quarter-wave film formed on the second surface of the second substrate, a second polarization film formed on the second quarter-wave film, and a color filter formed on the first surface of the second substrate.

In one embodiment, the first polarization film is corresponding to one of a left-circular polarizer and a right-circular polarizer, and wherein the second polarization film is the other of the left-circular polarizer and the right-circular polarizer. In another embodiment, each of the first polarization film and the second polarization film includes a linear polarizer having a polarization axis, and wherein the first polarization film and the second polarization film are arranged such that the polarization axis of the first polarization film is perpendicular to that of the second polarization film.

In one embodiment, the first structure further comprises an insulating layer formed on the metal layer and the flat area of the organic layer, and wherein the plurality of electrodes is formed on the insulating layer.

In another embodiment, the plurality of electrodes is formed on the color filter.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, the terms "comprising," "including," "having," "containing," and the like are to be understood to be open-ended, i.e., to mean including but not limited to.

The description will be made as to the embodiments of the present invention in conjunction with the accompanying drawings of FIGS. 1-5. In accordance with the purposes of this invention, as embodied and broadly described herein, this invention, in one aspect, relates to a transflective LCD that utilizes (1) the properties of liquid crystals in the blue phase in which the liquid crystals are isotropic when no electric field is applied and anisotropic when electric field is applied, (2) the relationship of the induced birefringence, Δn, and the electric field, E, which is of:

$$\Delta n = \lambda * K * E^2 \text{ (Kerr effect)},$$

(3) circular polarization films (PFs), and (4) the design of electrodes of which the electrode distance (d2) in a reflective area is larger than that (d1) in a transmissive area, preferably, $d2=\sqrt{2}\,d1$.

Figure 1:
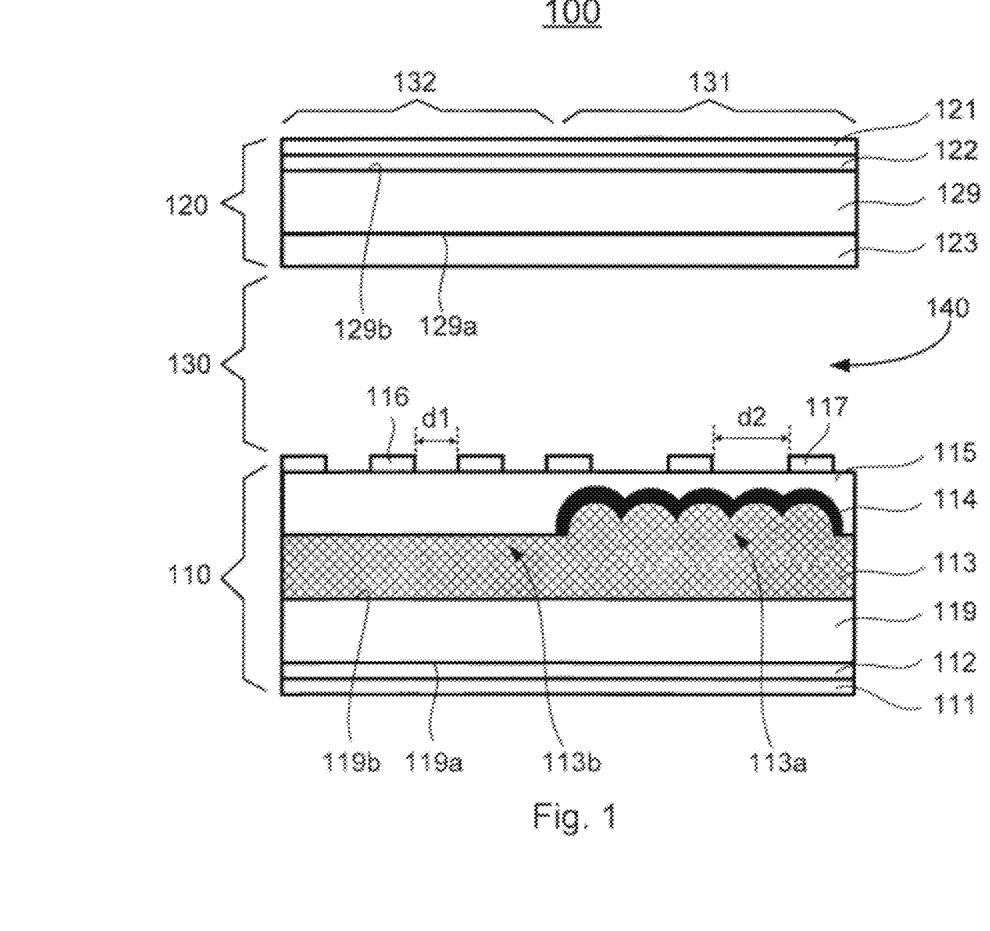
FIG. 1 shows schematically a cross-sectional view of a pixel structure of a transflective LCD according to one embodiment of the present invention.

The transflective LCD comprises a plurality of pixels. Referring to FIG. 1, a pixel 100 is shown schematically according to one embodiment of the present invention. The pixel 100 includes a first structure 110, a second structure 120 positioned apart from the first structure 110 define a cell gap 130 therebetween, and a liquid crystal layer 140 positioned in the cell gap 130 between the first structure 110 and the second structure 120. Among other things, the liquid crystal layer 140 is preferably formed of liquid crystals in the blue phase. The first structure 110 defines a reflective area 131 and a transmissive area 132 adjacent to the reflective area 131 of the pixel 100. The transmissive area 132 is adapted for allowing light transmission sequentially through the first structure 110, the liquid crystal layer 140 and the second structure 120, thereby defining a transmissively optical path of the transmissive light. The reflective area 131 is adapted for allowing light entering from the second structure 120 through the liquid crystal layer 140 to reflect at the metal layer 114 back through the liquid crystal layer 140 to the second structure 120, thereby defining a reflectively optical path of the reflective light.

Specifically, the first structure 110 includes a first substrate 119 having a first surface 119a and an opposite, second surface 119b, a first quarter-wave film (QWF) 112 formed on the first surface 119a of the first substrate 110, a first PF 111 formed on the first QWF 112, an organic layer 113 having a bump area 113a and a flat area 113b extending from the bump area 113 formed on the second surface 119b of the first substrate 119, a metal layer 114 formed on the bump area 113a of the organic layer 113 so as to define the reflective area 131 therewith and the transmissive area 132 adjacent to the reflective area 131, and an insulating layer 115 formed on the metal layer 114 and the flat area 113b of the organic layer 113. The bump area 113a is protruded relative to the flat area 113b of the organic layer 113. The metal layer is non-transparent to light. The metal layer is formed of aluminum (Al) or the other metal.

Further, a plurality of electrodes 116 and 117 is formed on the insulating layer 115. Of them, at least two electrodes 116 are positioned in the transmissive area 132 and at least two electrodes 117 are positioned in the reflective area 131. The electrodes 116 and 117 are preferably formed of ITO. According to the present invention, the distance d2 between the at least two electrodes 117 in the reflective area 131 is larger than the distance d1 between the at least two electrodes 116 in the transmissive area 132, i.e., d2>d1. The distances d1 and d2 determine the intensity of the electric field applied to the electrodes, thus the induced birefringence Δn of the liquid crystals of the liquid crystal layer 140, which in turn, determines the length of the reflectively optical path of light reflected back by the reflective area 131 and the length of the transmissively optical path of light transmitting through the transmissive area. In one embodiment, $d2=\sqrt{2}\,d1$. As a result, both the lengths of the reflectively optical path of light reflected back by the reflective area 131 and the transmissively optical path of light transmitting through the transmissive area are same. According to the present invention, neither a pattern retarder nor a multi-cell gap needs in the pixel design of the transflective LCD.

Additionally, the second structure 120 has a second substrate 129 having a first surface 129a and an opposite, second surface 129b, a second QWF 122 formed on the second surface 129b of the second substrate 129, a second PF 121 formed on the second QWF 122, and a color filter 123 formed on the first surface 129a of the second substrate 129.

In one embodiment, the first PF 111 is corresponding to one of a left-circular polarizer and a right-circular polarizer, and the second PF 121 is the other of the left-circular polarizer and the right-circular polarizer. In another embodiment, each of the first PF 111 and the second PF 121 includes a linear polarizer. The first PF 111 and the second PF 121 are orthogonally arranged.

In one embodiment, the first and second substrates 119 and 129 are made of glass. The first and second PFs 111 and 121, the first and second QWFs 112 and 122, the organic layer 113, the insulating layer 115 and color filter 123 are formed of materials transparent to light beams/waves.

Figure 2:
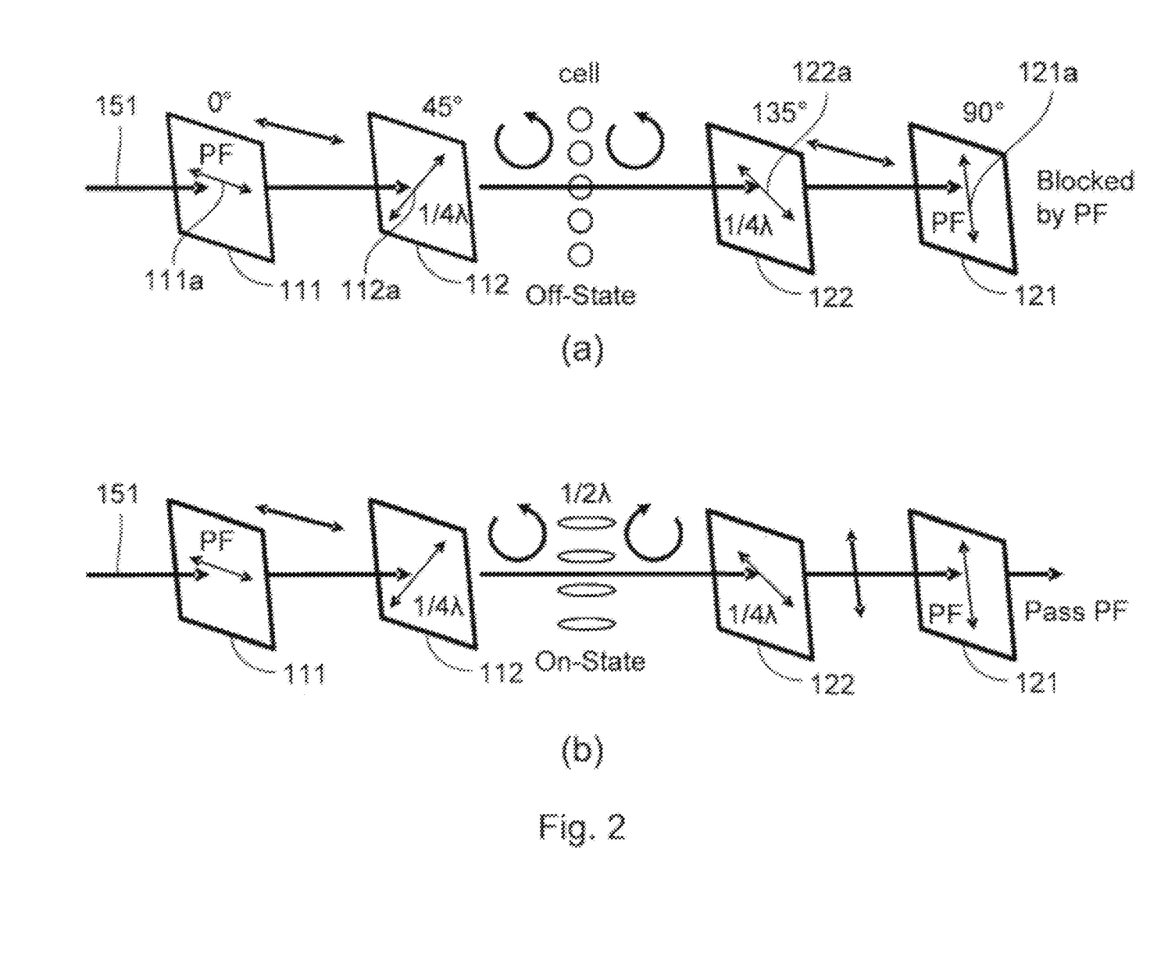
FIG. 2 shows an optical path of light transmitting through the transmissive area of the pixel shown in FIG. 1, (a) in an off-state, and (b) in an on-state.
Figure 3:
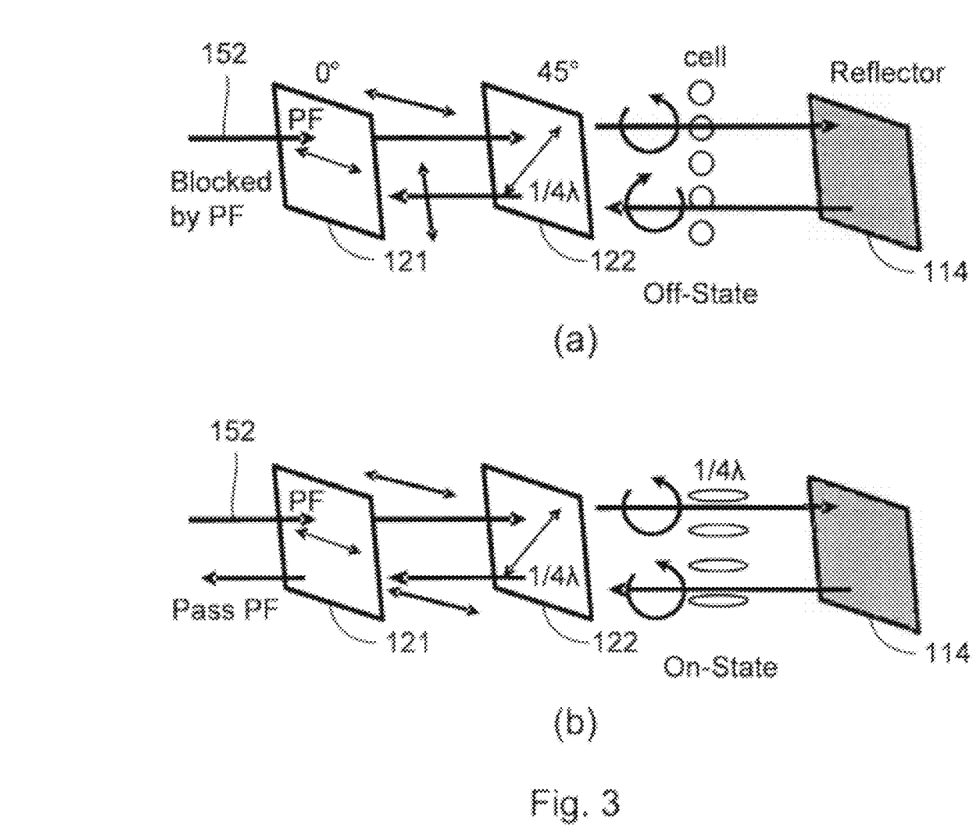
FIG. 3 shows an optical paths of light reflected back by the reflective area of the pixel shown in FIG. 1, (a) in an off-state, and (b) in an on-state.

FIGS. 2 and 3 show respectively optical paths of light transmitting through the transmissive area 132 and reflected back by the reflective area 131 of the pixel 100 shown in FIG. 1. In this exemplary embodiment, the polarization (transmission) axis 111a of the first PF 111 is oriented horizontally, while the polarization axis 121a of the second PF 121 is oriented vertically. Additionally, the polarization axis 112a of the first QWF 112 is oriented in about 45° relative to the polarization axis 111a of the first PF 111, and the polarization axis 122a of the second QWF 122 is oriented in about 135° relative to the polarization axis 111a of the first PF 111.

FIG. 2(a) shows the optical paths of light transmitting through the transmissive area 132 of the pixel 100, where no electric field is applied in the liquid crystals (cell), and thus the liquid crystals are isotropic, i.e., in an off-state. When a beam of light 151 passes through the first PF 111, it becomes linearly polarized along the horizontal direction. The linearly polarized light then passes through the first QWF 112 and becomes left-circularly (or right-circularly) polarized. The left-circularly (or right-circularly) polarized light passes through the liquid crystals 140 and remains left-circularly (or right-circularly) polarized. The left-circularly (or right-circularly) polarized light passes through the second QWF 121 and becomes linearly polarized along the horizontal direction. The linearly polarized light along the horizontal direction travels to the second PF 121 and is blocked thereof, and thus no light passes through the second PF 121.

FIG. 2(b) shows the optical paths of light transmitting through the transmissive area 132 of the pixel 100, where an electric field is applied in the liquid crystals, and thus the liquid crystals are anisotropic, i.e., in an on-state. In this case, there is a ½ phase retardation in the liquid crystal cell. When a beam of light 151 passes through the first PF 111, it becomes linearly polarized along the horizontal direction. The linearly polarized light then passes through the first QWF 112 and becomes left-circularly (or right-circularly) polarized. The left-circularly (or right-circularly) polarized light passes through the liquid crystals 140 and becomes right-circularly (or left-circularly) polarized. The right-circularly (or left-circularly) polarized light passes through the second QWF 121 and becomes linearly polarized along the vertical direction. The linearly polarized light along the vertical direction travels to and passes through the second PF 121.

FIG. 3(a) shows the optical paths of light reflected back by the reflective area 131 of the pixel 100, where no electric field is applied in the liquid crystals, and the liquid crystals are isotropic, i.e., in an off-state. When a beam of light 152 passes through the second PF 121, it becomes linearly polarized along the horizontal direction. The linearly polarized light then passes through the second QWF 122 and becomes left-circularly (or right-circularly) polarized. The left-circularly (or right-circularly) polarized light passes through the liquid crystal cell 140 and remains left-circularly (or right-circularly) polarized. The left-circularly (or right-circularly) polarized light travels to the reflective metal surface 114 and is reflected back with the polarization changed to be right-circularly (or left-circularly) polarized. The right-circularly (or left-circularly) polarized light passes through the liquid crystal cell 140 and remains right-circularly (or left-circularly) polarized, which in turn, passes through the second QWF 122 and becomes linearly polarized along the vertical direction. The linearly polarized light along the vertical direction travels to the second PF 121 and is blocked thereof, and thus no light passes through the second PF 121.

FIG. 3(b) shows the optical paths of light reflected back by the reflective area 131 of the pixel 100, where electric field is applied in the liquid crystals, and the liquid crystals are anisotropic, i.e., in an on-state. When a beam of light 152 passes through the second PF 121, it becomes linearly polarized along the horizontal direction. The linearly polarized light then passes through the second QWF 122 and becomes left-circularly (or right-circularly) polarized. The left-circularly (or right-circularly) polarized light passes through the liquid crystal cell 140 and linearly polarized. The linearly polarized light travels to the reflective metal surface 114 and is reflected back with the linear polarization. The linearly polarized light passes through the liquid crystal cell 140 and becomes left-circularly (or right-circularly) polarized, which in turn, passes through the second QWF 122 and becomes linearly polarized along the horizontal direction. The linearly polarized light along the horizontal direction travels to and passes through the second PF 121.

In the exemplary embodiment, both the lengths of the reflectively optical path of light 152 reflected back by the reflective area 131 and the transmissively optical path of light 151 transmitting through the transmissive area 132 are same when the liquid crystals are in the on-state. Accordingly, the V-T curves in both the reflective area 131 and the transmissive area 132 of the pixel 100 are same.

Figure 4:
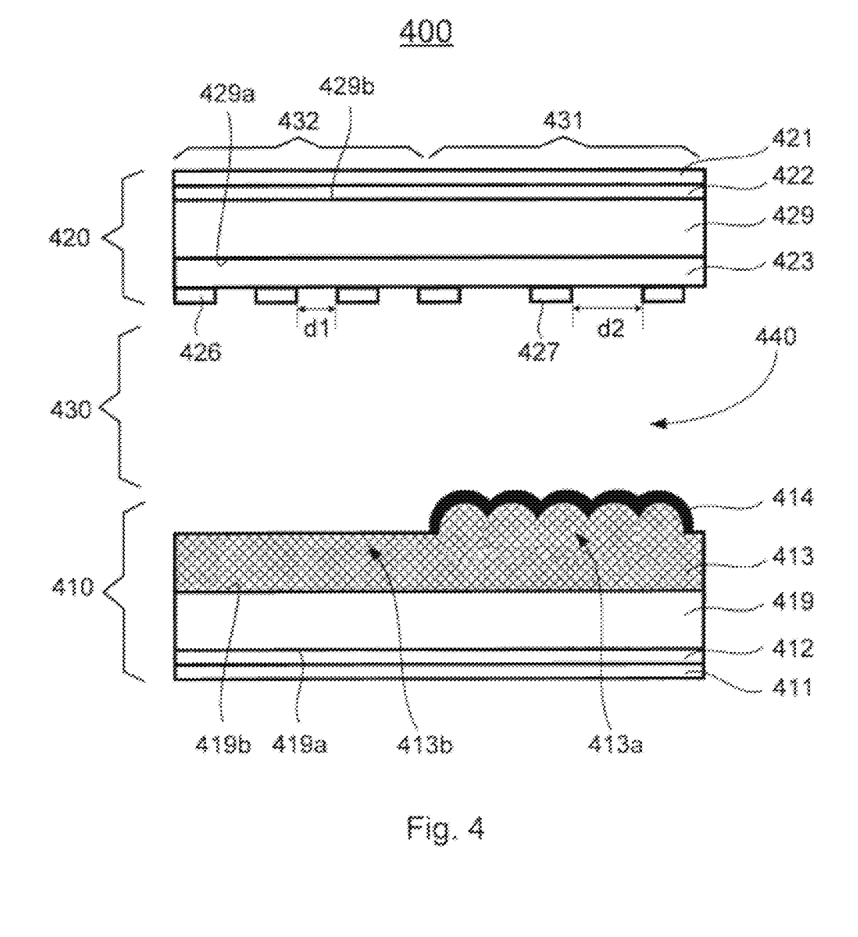
FIG. 4 shows schematically a cross-sectional view of a pixel structure of a transflective LCD according to another embodiment of the present invention.

Referring now to FIG. 4, a pixel 400 usable for the transflective LCD is shown according another embodiment of the present invention. The pixel 400 includes a first structure 410, a second structure 420 positioned apart from the first structure 410 define a cell gap 430 therebetween, and a liquid crystal layer 440 positioned in the cell gap 430 between the first structure 410 and the second structure 420. Preferably, the liquid crystal layer 440 is formed of liquid crystals in the blue phase. The first structure 410 defines a reflective area 431 and a transmissive area 432 adjacent to the reflective area 431 of the pixel 400. The transmissive area 432 is adapted for allowing light transmission sequentially through the first structure 410, the liquid crystal layer 440 and the second structure 420, thereby defining a transmissively optical path of the transmissive light. The reflective area 431 is adapted for allowing light entering from the second structure 420 through the liquid crystal layer 440 to reflect at the metal layer 414 back through the liquid crystal layer 440 to the second structure 420, thereby defining a reflectively optical path of the reflective light.

As shown in FIG. 4, the first structure 410 includes a first substrate 419 having a first surface 419a and an opposite, second surface 419b, a first quarter-wave film (QWF) 412 formed on the first surface 419a of the first substrate 410, a first PF 411 formed on the first QWF 412, an organic layer 413 having a bump area 413a and a flat area 413b extending from the bump area 413 formed on the second surface 419b of the first substrate 419, and a metal layer 414 formed on the bump area 413a of the organic layer 413 so as to define the reflective area 431 therewith and the transmissive area 432 adjacent to the reflective area 431. The bump area 413a is protruded relative to the flat area 413b of the organic layer 413. The metal layer is non-transparent to light. The metal layer is formed of alumina (Al) or the other metal.

Additionally, the second structure 420 has a second substrate 429 having a first surface 429a and an opposite, second surface 429b, a second QWF 422 formed on the second surface 429b of the second substrate 429, a second PF 421 formed on the second QWF 422, and a color filter 423 formed on the first surface 429a of the second substrate 429. The plurality of electrodes 416 and 417 is formed on the color filter 423. Of them, at least two electrodes 416 are positioned in the transmissive area 432 and at least two electrodes 417 are positioned in the reflective area 431. According to the present invention, the distance d2 between the at least two electrodes 417 in the reflective area 431 is larger than the distance d1 between the at least two electrodes 416 in the transmissive area 432, i.e., d2>d1. Preferably, d2=√2 d1.

In one embodiment, the first PF 411 is corresponding to one of a left-circular polarizer and a right-circular polarizer, and the second PF 421 is the other of the left-circular polarizer and the right-circular polarizer. In another embodiment, each of the first PF 411 and the second PF 421 includes a linear polarizer. The first PF 411 and the second PF 421 are orthogonally arranged.

In the fabrication of the pixel 100 or 400, the organic bumps are formed after array TFT process, such as GE, AS, SD and BP. The electrode ITO is formed after the bump process (before or after the Al layer is formed, Al also can be used as an electrode).

Figure 5:
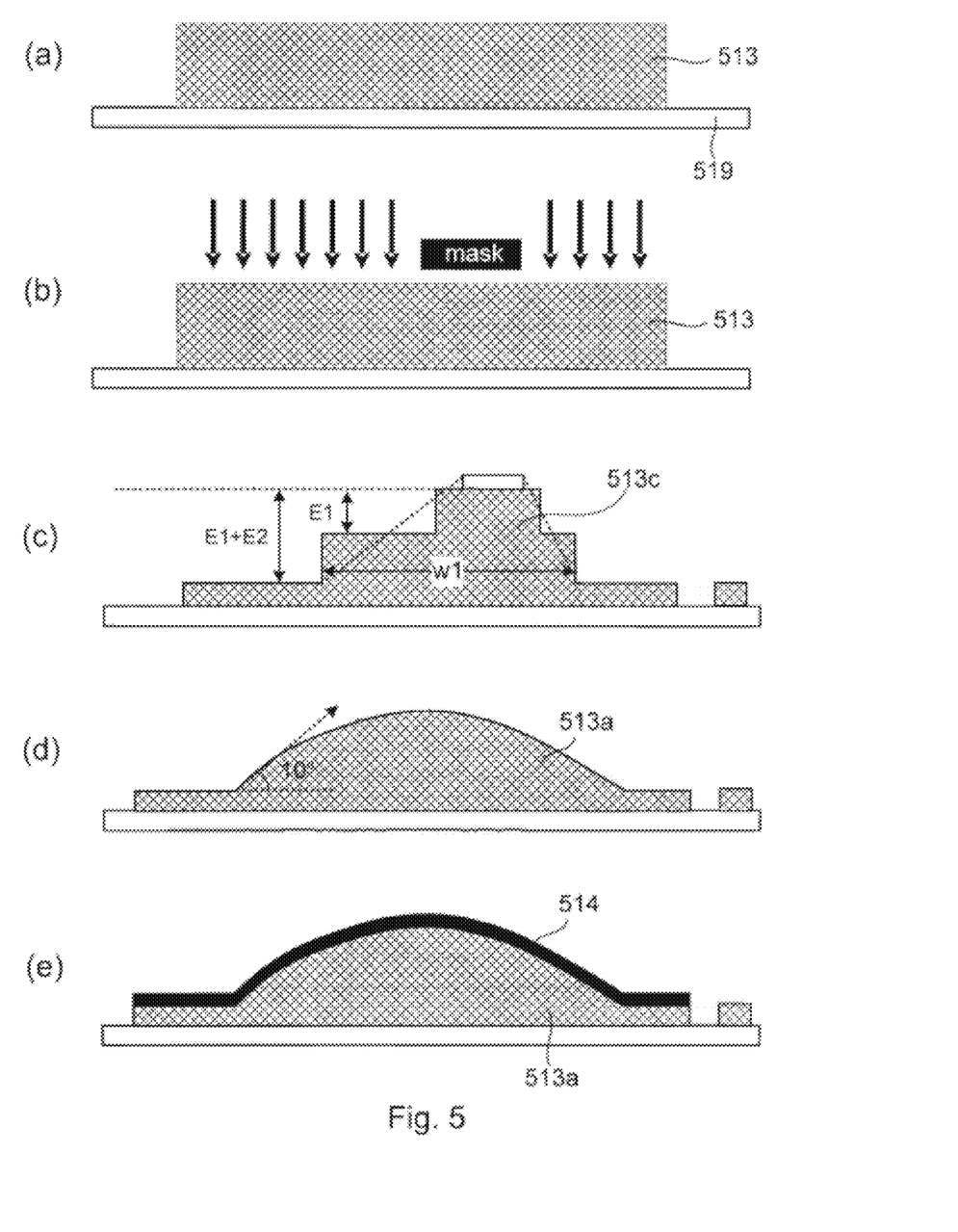
FIG. 5 shows schematically fabricating processes (a)-(e) of reflective bumps of a pixel structure of a transflective LCD according to one embodiment of the present invention.

FIG. 5 shows schematically fabricating processes of reflective bumps of a pixel structure according to one embodiment of the present invention. The process is as follows: at first, a thick organic layer 513 is coated on a glass substrate 519, as shown in FIG. 5(a). Then, the exposure and developing processes are sequentially applied to the organic layer 513 so as to fabricate an organic structure 513c with different heights, as shown in FIGS. 5(b) and 5(c). The organic structure 513c is baked, reflowed and smoothed to form an organic bump 513a having the tape about 10°, as shown in FIG. 5(d). As shown in FIG. 5(e), a reflective metal such as Al is then sputtered on the bump 513a to form a reflective layer/surface 514 thereon.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A transflective liquid crystal display (LCD) comprising a plurality of pixels, each pixel comprising:
   (a) a first structure comprising:
      (i) a first substrate having a first surface and an opposite, second surface;
      (ii) a first quarter-wave film formed on the first surface of the first substrate;
      (iii) a first polarization film formed on the first quarter-wave film;
      (iv) an organic layer having a bump area and a flat area extending from the bump area, formed on the second surface of the first substrate; and
      (v) a metal layer formed on the bump area of the organic layer so as to define a reflective area therewith and a transmissive area adjacent to the reflective area;
   (b) a second structure comprising:
      (i) a second substrate having a first surface and an opposite, second surface;
      (ii) a second quarter-wave film formed on the second surface of the second substrate;
      (iii) a second polarization film formed on the second quarter-wave film;
      (iv) a color filter formed on the first surface of the second substrate; and
      (v) a plurality of electrodes formed on the color filter such that at least two electrodes are positioned in the transmissive area and define a first distance therebetween, and at least two electrodes are positioned in the reflective area and define a second distance therebetween, wherein the second distance is larger than the first distance,
      wherein the first structure and the second structure are positioned relative to each other to define a cell gap therebetween; and
   (c) a liquid crystal layer positioned in the cell gap between the first structure and the second structure.

2. The transflective LCD of claim 1, wherein the liquid crystal layer comprises liquid crystals in the blue phase.

3. The transflective LCD of claim 1, wherein the second distance is $\sqrt{2}$ times of the first distance.

4. The transflective LCD of claim 1, wherein the bump area is protruded relative to the flat area of the organic layer.

5. The transflective LCD of claim 1, wherein the metal layer is non-transparent to light.

6. The transflective LCD of claim 1, wherein the first polarization film is corresponding to one of a left-circular polarizer and a right-circular polarizer, and wherein the second polarization film is the other of the left-circular polarizer and the right-circular polarizer.

7. The transflective LCD of claim 1, wherein each of the first polarization film and the second polarization film includes a linear polarizer having a polarization axis, and wherein the first polarization film and the second polarization film are arranged such that the polarization axis of the first polarization film is perpendicular to that of the second polarization film.

8. The transflective LCD of claim 1, wherein the reflectively optical path has a length that is substantially same as that of the transmissively optical path.

9. A transflective liquid crystal display (LCD) comprising a plurality of pixels, each pixel comprising:
   (a) a first structure defining a reflective area and a transmissive area adjacent to the reflective area;
   (b) a second structure comprising:
      (i) a substrate having a first surface and an opposite, second surface;
      (ii) a quarter-wave film formed on the second surface of the substrate;
      (iii) a polarization film formed on the quarter-wave film; and
      (iv) a color filter formed on the first surface of the substrate;
      wherein the first structure and the second structure are positioned relative to each other to define a cell gap therebetween;
   (c) a liquid crystal layer positioned in the cell gap between the first structure and the second structure; and
   (d) a plurality of electrodes formed on the color filter of the second structure such that at least two electrodes are positioned in the transmissive area and define a first distance therebetween, and at least two electrodes are positioned in the reflective area and define a second distance therebetween, wherein the second distance is larger than the first distance.

10. The transflective LCD of claim 9, wherein the liquid crystal layer comprises liquid crystals in the blue phase.

11. The transflective LCD of claim 9, wherein the second distance is $\sqrt{2}$ times of the first distance.

12. The transflective LCD of claim 9, wherein the first structure comprises:
   (i) a first substrate having a first surface and an opposite, second surface;
   (ii) a first quarter-wave film formed on the first surface of the first substrate;
   (iii) a first polarization film formed on the first quarter-wave film;
   (iv) an organic layer having a bump area and a flat area extending from the bump area, formed on the second surface of the first substrate; and
   (v) a metal layer formed on the bump area of the organic layer to define the reflective area therewith and the transmissive area adjacent to the reflective area.

13. The transflective LCD of claim 12, wherein the bump area is protruded relative to the flat area of the organic layer.

14. The transflective LCD of claim 12, wherein the metal layer is non-transparent to light.

15. The transflective LCD of claim 12, wherein the first polarization film is corresponding to one of a left-circular polarizer and a right-circular polarizer, and wherein the second polarization film is the other of the left-circular polarizer and the right-circular polarizer.

16. The transflective LCD of claim 12, wherein each of the first polarization film and the second polarization film includes a linear polarizer having a polarization axis, and wherein the first polarization film and the second polarization film are arranged such that the polarization axis of the first polarization film is perpendicular to that of the second polarization film.

* * * * *